(12) United States Patent
Watanabe et al.

(10) Patent No.: US 11,639,141 B2
(45) Date of Patent: May 2, 2023

(54) EXTERIOR MEMBER FOR ELECTRIC WIRE AND WIRE HARNESS

(71) Applicant: YAZAKI CORPORATION, Tokyo (JP)

(72) Inventors: Masafumi Watanabe, Makinohara (JP); Hiroyuki Murakoshi, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/537,385

(22) Filed: Nov. 29, 2021

(65) Prior Publication Data

US 2022/0169191 A1 Jun. 2, 2022

(30) Foreign Application Priority Data

Nov. 30, 2020 (JP) .............................. JP2020-198000

(51) Int. Cl.
*B60R 16/02* (2006.01)
*H02G 3/04* (2006.01)

(52) U.S. Cl.
CPC ....... *B60R 16/0215* (2013.01); *H02G 3/0468* (2013.01)

(58) Field of Classification Search
CPC ............ B60R 16/0207; B60R 16/0215; H02G 3/0468; H02G 3/0481; H02G 3/0487; H02G 3/0462
See application file for complete search history.

(56) References Cited

U.S. PATENT DOCUMENTS

| 5,435,871 | A | 7/1995 | Streit | |
|---|---|---|---|---|
| 2004/0213541 | A1* | 10/2004 | Hallinan | H02G 3/0481 385/147 |
| 2016/0315437 | A1* | 10/2016 | Schaible | H01R 31/065 |
| 2019/0312417 | A1 | 10/2019 | Chu | |

FOREIGN PATENT DOCUMENTS

| DE | 102014202672 A1 | 8/2015 |
|---|---|---|
| JP | 2006-296166 A | 10/2006 |
| JP | 2011-239595 A | 11/2011 |

* cited by examiner

*Primary Examiner* — Paresh Paghadal
(74) *Attorney, Agent, or Firm* — Kenealy Vaidya LLP

(57) ABSTRACT

A wire harness includes an electric wire bundle and an exterior member for electric wire. The exterior member for electric wire includes a tubular exterior body for protecting the electric wire bundle, a slit formed in the exterior body along an exterior axis of the exterior body, and an inner portion continuous with a circumferential end portion of the exterior body. The inner portion is disposed on an outer side of the exterior body before the electric wire bundle is accommodated. Further, the inner portion is formed with an electric wire pressed portion against which the electric wire bundle is pressed. Further, the inner portion is pushed into the exterior body through the slit while being deformed so as to be inverted when the electric wire bundle is pressed against the electric wire pressed portion, and is accommodated in the exterior body together with the electric wire bundle.

6 Claims, 6 Drawing Sheets

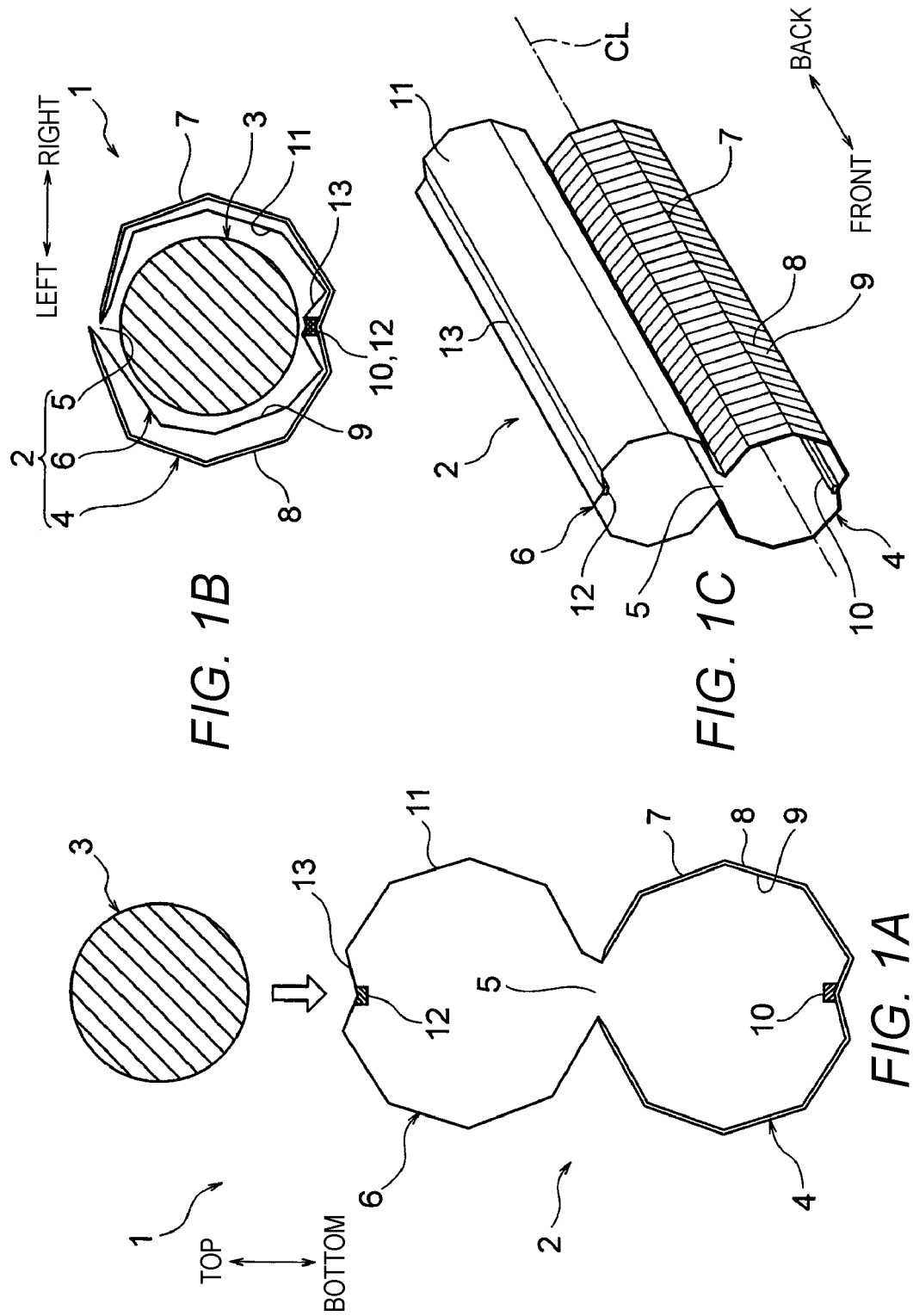

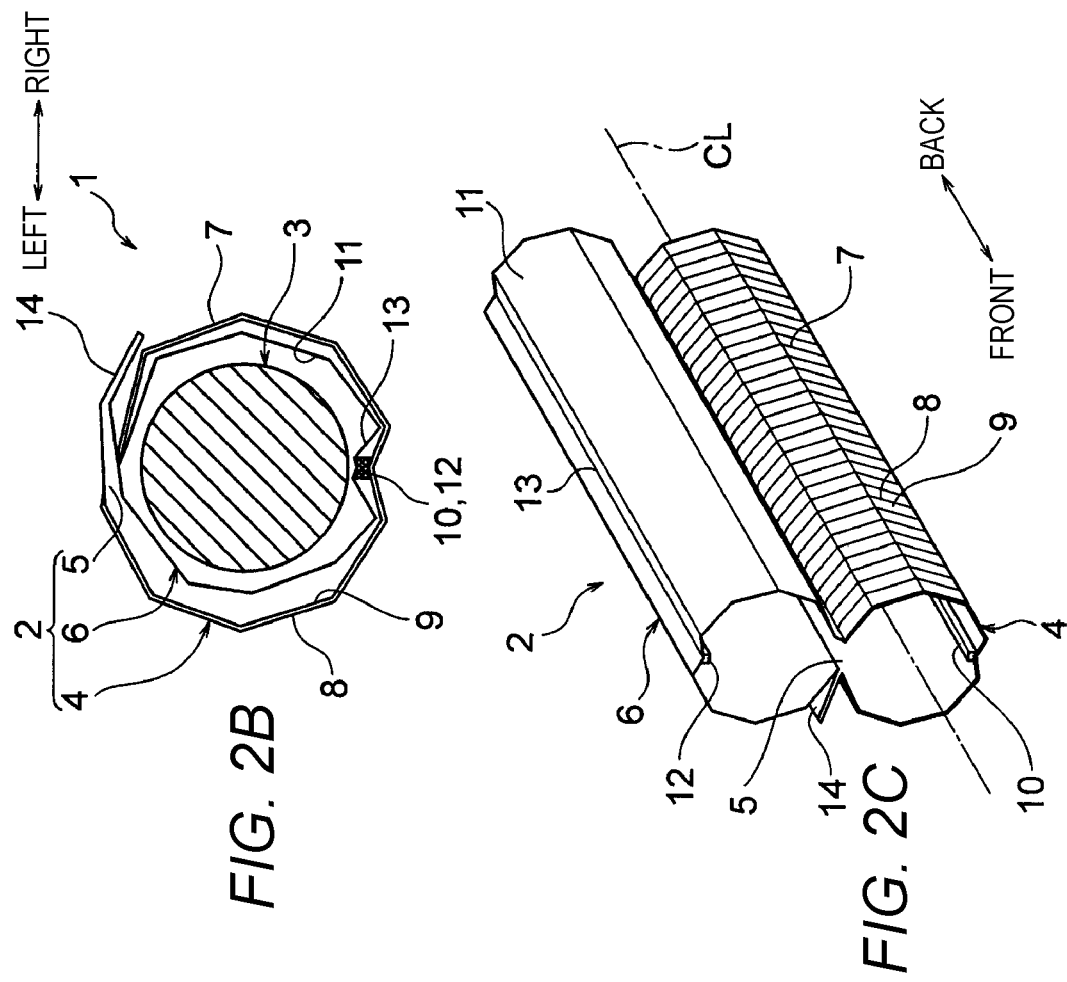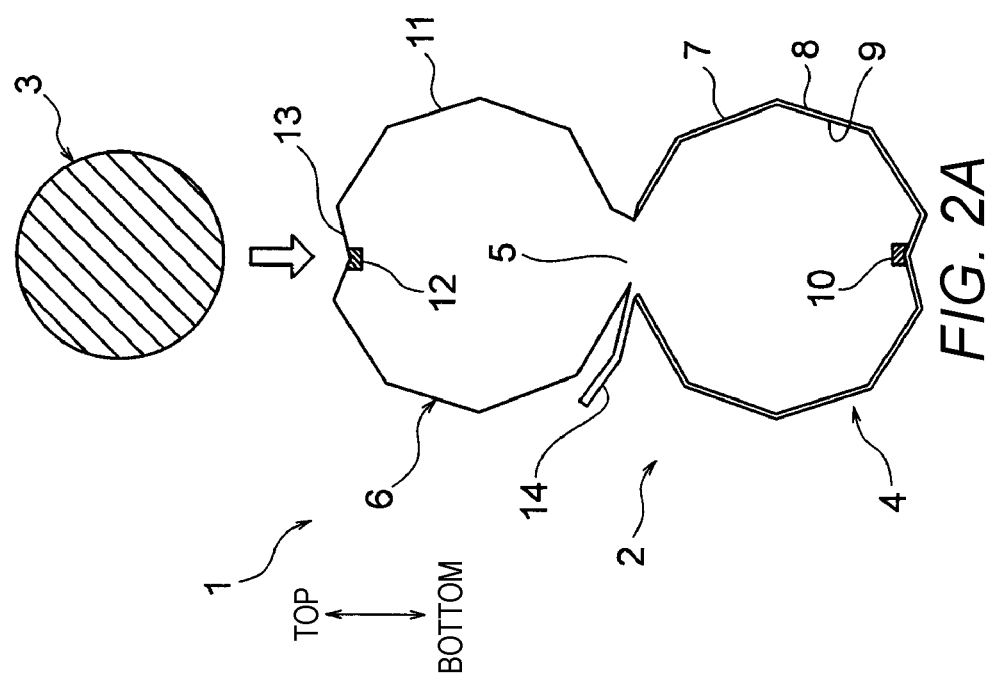

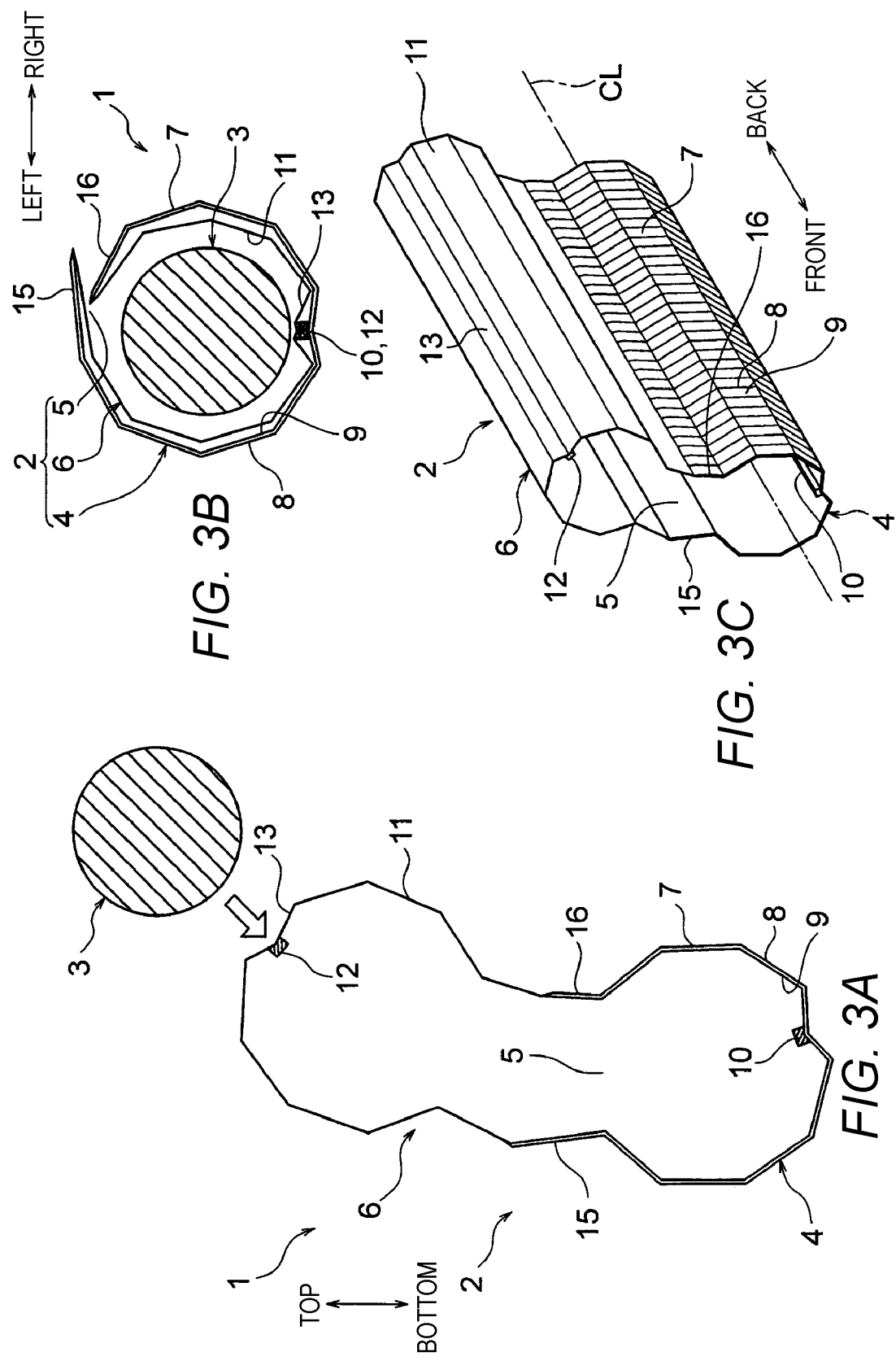

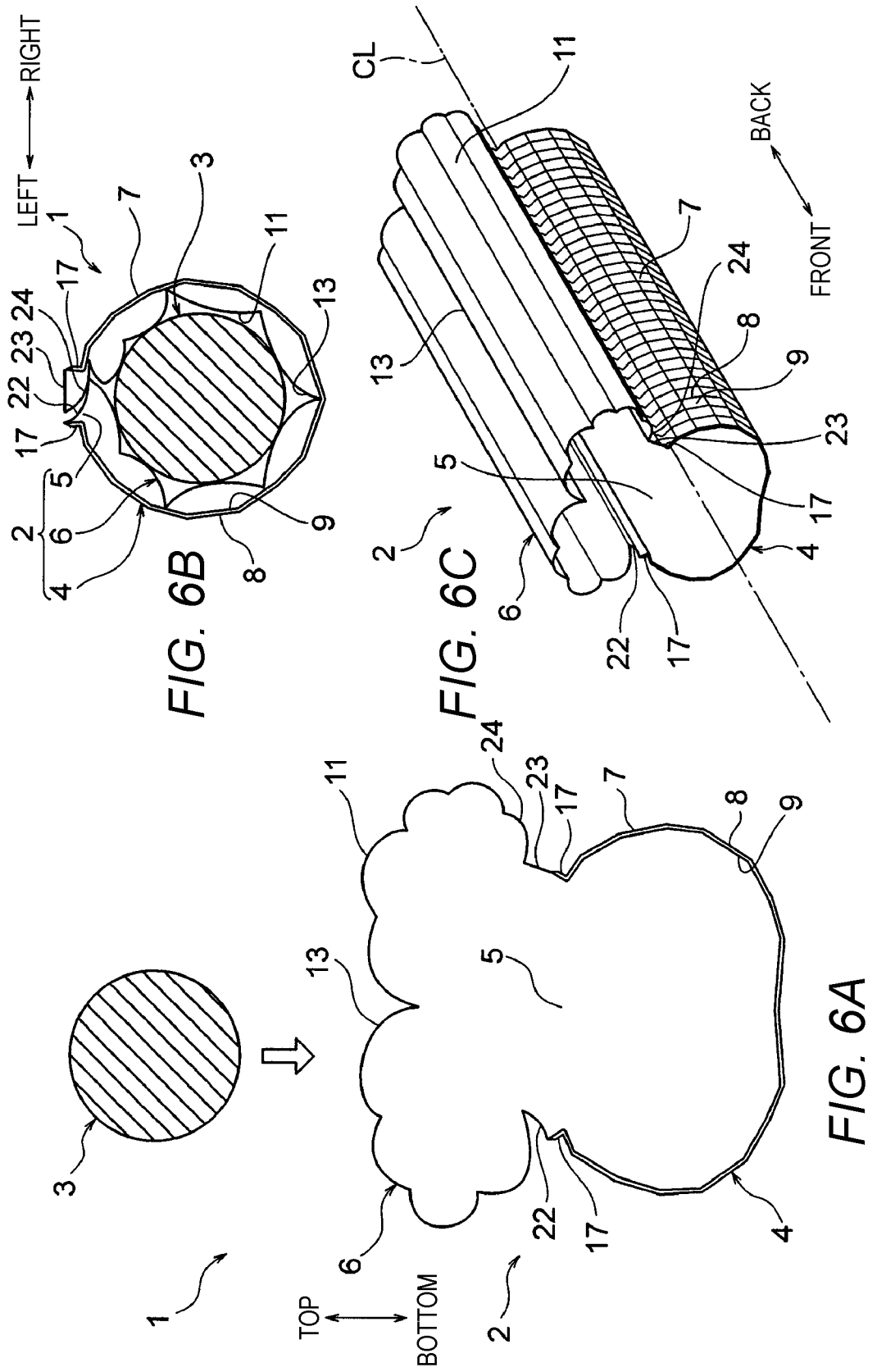

EXTERIOR MEMBER FOR ELECTRIC WIRE AND WIRE HARNESS

CROSS-REFERENCE TO RELATED APPLICATIONS

This application is based on and claims priority under 35 USC 119 from Japanese Patent Application No. 2020-198000 filed on Nov. 30, 2020, the contents of which are incorporated herein by reference.

TECHNICAL FIELD

The present invention relates to an exterior member for electric wire so as to protect one or a plurality of electric wires, and a wire harness including the exterior member for electric wire.

BACKGROUND ART

A wire harness for electrically connecting devices mounted on an automobile includes one or a plurality of electric wires and a corrugated tube (exterior member for electric wire) for protecting the electric wire(s) (for example, see Patent Literature 1 below).

CITATION LIST

Patent Literature

Patent Literature 1: JP-2011-239595-A

The corrugated tube serving as the exterior member for electric wire includes a corrugated tube having a slit along a tube axial direction and a corrugated tube having no slit. In a case of the corrugated tube having the slit, a dedicated jig is used to accommodate the electric wire, and the jig pushes and widens the slit so that the electric wire is not damaged by the slit. Since it is necessary to attach and detach the jig by using the jig, it is difficult to accommodate the electric wire by using an automatic machine in a structure of the related-art corrugated tube.

SUMMARY OF INVENTION

The present invention has been made in view of the above-described circumstances, and an object thereof is to provide an exterior member for electric wire capable of accommodating an electric wire by using an automatic machine, and a wire harness including the exterior member for electric wire.

According to an embodiment, there is provided an exterior member for electric wire including: a tubular exterior body for protecting one or a plurality of electric wires; a slit formed in the exterior body along an exterior axis of the exterior body; and an inner portion continuous with a circumferential end portion of the exterior body around the exterior axis. The inner portion is disposed on an outer side of the exterior body before the electric wire is accommodated, is formed with an electric wire pressed portion against which the electric wire is pressed, and is pushed into the exterior body through the slit while being deformed so as to be inverted when the electric wire is pressed against the electric wire pressed portion and is accommodated in the exterior body together with the electric wire.

BRIEF DESCRIPTION OF DRAWINGS

FIGS. 1A to 1C are schematic views showing an embodiment of an exterior member for electric wire and a wire harness of the present invention, FIG. 1A is an end view of the exterior member for electric wire before the electric wire is accommodated, FIG. 1B is an end view of the exterior member for electric wire after the electric wire is accommodated, and FIG. 1C is a perspective view of the exterior member for electric wire (first embodiment).

FIGS. 2A to 2C are schematic views showing another embodiment of the exterior member for electric wire and the wire harness of the present invention, FIG. 2A is an end view of the exterior member for electric wire before the electric wire is accommodated, FIG. 2B is an end view of the exterior member for electric wire after the electric wire is accommodated, and FIG. 2C is a perspective view of the exterior member for electric wire (second embodiment).

FIGS. 3A to 3C are schematic views showing another embodiment of the exterior member for electric wire and the wire harness of the present invention, FIG. 3A is an end view of the exterior member for electric wire before the electric wire is accommodated, FIG. 3B is an end view of the exterior member for electric wire after the electric wire is accommodated, and FIG. 3C is a perspective view of the exterior member for electric wire (third embodiment).

FIG. 4A is an end view of the exterior member for electric wire before the electric wire is accommodated, FIG. 4B is an end view of the exterior member for electric wire after the electric wire is accommodated, and FIG. 4C is a perspective view of the exterior member for electric wire (fourth embodiment).

FIG. 5A is an end view of the exterior member for electric wire before the electric wire is accommodated, FIG. 5B is an end view of the exterior member for electric wire after the electric wire is accommodated, and FIG. 5C is a perspective view of the exterior member for electric wire (fifth embodiment).

FIGS. 6A to 6C are schematic views showing another embodiment of the exterior member for electric wire and the wire harness of the present invention, FIG. 6A is an end view of the exterior member for electric wire before the electric wire is accommodated, FIG. 6B is an end view of the exterior member for electric wire after the electric wire is accommodated, and FIG. 6C is a perspective view of the exterior member for electric wire (sixth embodiment).

DESCRIPTION OF EMBODIMENTS

Figure 4B:
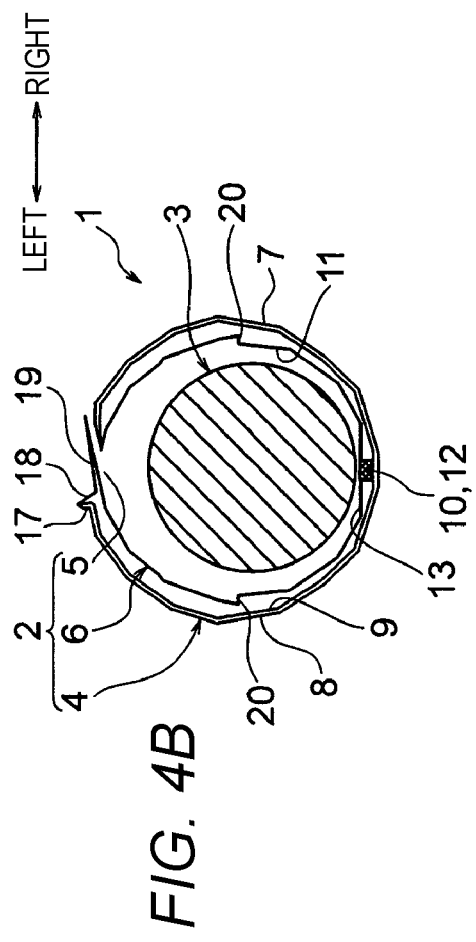
FIGS. 4A to 4C are schematic views showing another embodiment of the exterior member for electric wire and the wire harness of the present invention.

A wire harness includes one or a plurality of electric wires and an exterior member for electric wire. The exterior member for electric wire includes a tubular exterior body for protecting the electric wire, a slit formed in the exterior body along an exterior axis of the exterior body, and an inner portion continuous with a circumferential end portion of the exterior body. The inner portion is disposed on an outer side of the exterior body before the electric wire is accommodated. Further, the inner portion is formed with an electric wire pressed portion against which the electric wire is pressed. Further, the inner portion is pushed into the exterior body through the slit while being deformed so as to be inverted when the electric wire is pressed against the electric wire pressed portion, and is accommodated in the exterior body together with the electric wire.

First Embodiment

Hereinafter, a first embodiment will be described with reference to the drawings. FIGS. 1A to 1C are schematic views showing the embodiment of the exterior member for electric wire and the wire harness of the invention. FIG. 1A is an end view of the exterior member for electric wire before the electric wire is accommodated. FIG. 1B is an end view of the exterior member for electric wire after the electric wire is accommodated. FIG. 1C is a perspective view of the exterior member for electric wire.

In FIGS. 1A to 1C, a wire harness 1 is routed at a predetermined position of an automobile in order to electrically connect devices mounted on the automobile. The wire harness 1 includes the exterior member for electric wire 2, an electric wire bundle 3 in which a plurality of electric wires are bundled, and terminal fittings (not illustrated) provided at ends of the electric wires of the electric wire bundle 3. The exterior member for electric wire 2 is provided to accommodate and protect the electric wire bundle 3. Each electric wire that constitutes the electric wire bundle 3 includes a conductor having conductivity and an insulating insulator that covers the conductor. Not limited to the electric wire bundle 3, for example, one thick electric wire may be adopted. As will be understood from the following description, the electric wire bundle 3 is accommodated in the exterior member for electric wire 2 by one touch. In other words, the exterior member for electric wire 2 has a structure capable of accommodating the electric wire bundle 3 in a one-touch manner. As a matter of course, the one-touch accommodation can be manufactured using an automatic machine. Accordingly, automation and mechanization are enabled.

The exterior member for electric wire 2 is a resin molded product, and is formed into a tubular shape by a manufacturing method similar to that of a known corrugated tube. After resin molding, the exterior member for electric wire 2 is cut at a predetermined length in a direction of an exterior axis CL described later and is used. The exterior member for electric wire 2 includes the exterior body 4, the slit 5 formed in the exterior body 4, and the inner portion 6 continuous with the slit 5 on an outer side of the exterior body 4 (continuous with the circumferential end portion of the exterior body 4 described later). The inner portion 6 is pushed into the exterior body 4 through the slit 5 while being deformed so as to be inverted (described later), and is accommodated in the exterior body 4 together with the electric wire bundle 3.

Hereinafter, structures of the exterior body 4 and the inner portion 6 will be described. For convenience of explanation, directions indicated by arrows in the drawings are defined as an "upper-lower direction", a "left-right direction", and a "front-rear direction". Specifically, in FIG. 1A, an illustrated side of the electric wire bundle 3 is defined as an upper side, and an illustrated side of the exterior body 4 is defined as a lower side. In FIG. 1B, left and right sides of the sheet are defined as left and right sides around the electric wire bundle 3. In FIG. 1C, a front side of the sheet is defined as a front side and a back side of the sheet is defined as a back side in a direction in which the exterior axis CL described later extends.

The exterior body 4 is disposed on the lower side in FIGS. 1A and 1C. The exterior body 4 is formed in a tubular shape that extends in the direction of the exterior axis CL. The slit 5 is formed in the exterior body 4 along the exterior axis CL. The inner portion 6 is continuously formed on a left side portion and a right side portion of the slit 5 (in other words, the inner portion 6 is continuously formed on the circumferential end portion of the exterior body 4 around the exterior axis CL, and the circumferential end portion of the exterior body 4 is the same portion as the left side portion and the right side portion of the slit 5 in the first embodiment). The slit 5 is formed such that an interval between the left side portion and the right side portion is basically smaller than a diameter of the electric wire bundle 3 (as an exception, a sixth embodiment described later is widely illustrated).

End surfaces of the exterior body 4, that is, a front end surface and a rear end surface are formed in a polygonal shape except for the slit 5. Accordingly, a side surface 7 of the exterior body 4 is also formed in a polygonal shape. In the present embodiment, the exterior body 4 is formed to have the polygonal end surfaces and the polygonal side surface 7, but the present invention is not limited thereto, and a circular shape may be used. A reason why the polygonal end surfaces and the polygonal side surface 7 are adopted is to enable deformation such that the interval of the slit 5 is smoothly widened when the electric wire bundle 3 passes through the slit 5. Corner portions that constitute the polygonal shape are formed so as to have a hinge function in the present embodiment (the present invention is not limited to the hinge function, and any corner portion may be used as long as the interval is smoothly widened).

The side surface 7 of the exterior body 4 is formed in a bellows tube shape. That is, the side surface 7 is formed in the bellows tube shape so as to have peak portions and valley portions in a circumferential direction around the exterior axis CL and peak portions and valley portions alternately arranged along the exterior axis CL. Regarding the peak portions and the valley portions, solid lines that form polygonal shapes on outer sides of the end surfaces (the front end surface and the rear end surface) in FIGS. 1A and 1B schematically show the peak portions (referred to as schematic peak portions 8). Further, solid lines that form polygonal shapes on inner sides schematically show the valley portions (referred to as schematic valley portions 9). The exterior body 4 having the bellows tube shape is formed to have an appearance similar to that of the known corrugated tube. The exterior body 4 has bendability capable of being bent in the same manner as the corrugated tube.

The schematic peak portions 8 and the schematic valley portions 9 are formed in the following shape in the vicinity of the left side portion and the right side portion of the slit 5. That is, the schematic peak portion 8 and the schematic valley portion 9 are formed in a shape having an inclined surface in which a protrusion height of the schematic peak portion 8 gradually decreases and is continuous with the schematic valley portion 9. Since the shape is formed such that the protrusion height of the schematic peak portion 8 gradually decreases and is continuous with the schematic valley portion 9, the inner portion 6 can be continuous in a flat state at positions of the left side portion and the right side portion of the slit 5.

A body side lock portion 10 is formed on the exterior body 4. The body side lock portion 10 is disposed on an inner surface of the exterior body 4 and at a position opposite to the slit 5. The body side lock portion 10 is formed as an engagement destination (a fitting counterpart or a press-fitting counterpart) of an inner side lock portion 12 described later of the inner portion 6. The body side lock portion 10 is formed so as to extend straight from a position of the front end surface to a position of the rear end surface of the exterior body 4 along the exterior axis CL. The body side lock portion 10 is formed as a female lock portion in the present embodiment. A shape of the body side lock portion 10 is not particularly limited as long as the body side lock portion 10 is the engagement destination (the fitting counterpart or the press-fitting counterpart) of the inner side lock portion 12.

The inner portion 6 is formed in a tubular shape that extends along the exterior axis CL. The inner portion 6 is formed so as to be continuous with the left side portion and the right side portion of the slit 5. The inner portion 6 is disposed on an upper side of the exterior body 4 in FIGS. 1A and 1C. Since the inner portion 6 is disposed on the upper side of the exterior body 4, the exterior member for electric wire 2 is formed in an end surface shape of "8" (or "gourd"). The inner portion 6 is formed to have the same length in an exterior axis CL direction as that of the exterior body 4. The end surfaces, that is, the front end surface and the rear end surface of the inner portion 6 are formed in a polygonal shape except for the continuous position of the slit 5. Accordingly, a side surface 11 of the inner portion 6 is also formed in a polygonal shape. In the present embodiment, the inner portion 6 is formed so as to include the polygonal end surfaces and the polygonal side surface 11, but the present invention is not limited thereto, and is not particularly limited as long as the inner portion 6 has a shape that can be pushed into the exterior body 4 while being deformed in an inverted manner described later.

The inner portion 6 is formed with the inner side lock portion 12 to be engaged with the body side lock portion 10 of the exterior body 4. The inner side lock portion 12 is formed as a male lock portion. The inner side lock portion 12 is formed so as to extend straight from a position of the front end surface to a position of the rear end surface of the inner portion 6. The inner side lock portion 12 is disposed directly below an electric wire pressed portion 13 described later (the arrangement is assumed to be an example).

The inner portion 6 is formed in such a shape that when the inner side lock portion 12 is engaged with the body side lock portion 10, the inner portion 6 is pulled toward a body side lock portion 10 side at this time. When the inner portion 6 is in a state of being pulled toward the body side lock portion 10 side by the engagement between the inner side lock portion 12 and the body side lock portion 10, the interval between the left side portion and the right side portion of the slit 5 can be narrowed. Accordingly, it is possible to contribute to prevention of entry of foreign matter.

The inner portion 6 is formed with the electric wire pressed portion 13 against which the electric wire bundle 3 is pressed. The electric wire pressed portion 13 is disposed at an upper position on an outer surface of the inner portion 6. The electric wire pressed portion 13 is formed in such a shape that the upper position on the outer surface can be recessed toward a slit 5 side. The electric wire pressed portion 13 is formed so as to extend from the position of the front end surface to the position of the rear end surface of the inner portion 6 along the exterior axis CL.

In the above-described configuration and structure, when the electric wire bundle 3 is pressed against the electric wire pressed portion 13 of the inner portion 6 from above, the inner portion 6 is entirely deformed toward the slit 5 by a pressing force. Then, when the electric wire bundle 3 passes through the slit 5, the slit 5 is pushed and widened by the electric wire bundle 3. At this time, since the inner portion 6 is present between the electric wire bundle 3 and the slit 5, the electric wire bundle 3 is protected by the inner portion 6 (the electric wire bundle 3 is not damaged by the slit 5 even when a jig as in the related art is not used). When the electric wire bundle 3 is pushed (inserted) into the exterior body 4 together with the inner portion 6, the inner portion 6 is in a state of being completely inverted. Accordingly, accommodation of the electric wire bundle 3 is completed. When the inner portion 6 is accommodated in the exterior body 4, the inner side lock portion 12 is engaged with the body side lock portion 10 at this time. The inner portion 6 is in a state of being pulled toward the body side lock portion 10 side by the engagement. As a result, the interval between the left side portion and the right side portion of the slit 5 is narrowed.

The electric wire bundle 3 is accommodated in the exterior body 4 together with the inner portion 6 by one touch as described above. That is, since the accommodation of the electric wire bundle 3 is completed only by pushing the electric wire bundle 3, the exterior member for electric wire 2 can enable use of an automatic machine. Labor saving can also be achieved by enabling the use of the automatic machine. In addition, according to the exterior member for electric wire 2, it is not necessary to use a jig for inserting the electric wire bundle 3, and when the work of accommodating the electric wire bundle 3 is performed manually, it is possible to improve workability as compared with the related art.

Second Embodiment

Hereinafter, a second embodiment will be described with reference to the drawings. FIGS. 2A to 2C are schematic views showing another embodiment of the exterior member for electric wire and the wire harness of the present invention. FIG. 2A is an end view of the exterior member for electric wire before the electric wire is accommodated. FIG. 2B is an end view of the exterior member for electric wire after the electric wire is accommodated. FIG. 2C is a perspective view of the exterior member for electric wire. Component members and portions that are basically the same as those of the above-described first embodiment are denoted by the same reference numerals, and detailed description thereof will be partially omitted.

In FIGS. 2A to 2C, similar to the first embodiment, the wire harness 1 of the second embodiment includes the electric wire bundle 3, the exterior member for electric wire 2 of the second embodiment that accommodates and protects the electric wire bundle 3, and terminal fittings (not illustrated) provided at ends of electric wires of the electric wire bundle 3. The exterior member for electric wire 2 of the second embodiment can also accommodate the electric wire bundle 3 by one touch in the same manner as in the first embodiment.

The exterior member for electric wire 2 of the second embodiment includes the exterior body 4 having the slit 5, and the inner portion 6 continuous with the slit 5 (continuous with a circumferential end portion of the exterior body 4) on an outer side of the exterior body 4. The inner portion 6 is formed with a slit wrap portion 14 continuous with a left side portion of the slit 5 (continuous with a left circumferential end portion of the exterior body 4). The exterior member for electric wire 2 of the second embodiment is different from that of the first embodiment in that the slit wrap portion 14 is formed. The slit wrap portion 14 is formed in a shape that can cover the slit 5 when the inner portion 6 and the electric wire bundle 3 are accommodated (a shape that can wrap the slit 5, a shape that can cover the slit 5). The slit wrap portion 14 is formed in a shape that protrudes toward a left outer side longer than an interval between a left side portion and a right side portion of the slit 5.

In the above-described configuration and structure, when the electric wire bundle 3 is pressed against the electric wire pressed portion 13 of the inner portion 6 from above, the inner portion 6 is entirely deformed toward the slit 5 by a pressing force. Then, when the electric wire bundle 3 passes through the slit 5, the slit 5 is pushed and widened by the electric wire bundle 3. At this time, since the inner portion 6 is present between the electric wire bundle 3 and the slit 5, the electric wire bundle 3 is protected by the inner portion 6 (the electric wire bundle 3 is not damaged by the slit 5 even when a jig as in the related art is not used). When the electric wire bundle 3 is pushed (inserted) into the exterior body 4 together with the inner portion 6, the inner portion 6 is in a state of being completely inverted. Accordingly, accommodation of the electric wire bundle 3 is completed. When the inner portion 6 is accommodated in the exterior body 4, the inner side lock portion 12 is engaged with the body side lock portion 10 at this time. The inner portion 6 is in a state of being pulled toward a body side lock portion 10 side by the engagement. As a result, the slit wrap portion 14 covers the slit 5 from a left side. In the second embodiment, since the slit wrap portion 14 covers the slit 5, foreign matter can be prevented from entering more favorably than in the first embodiment. Although not particularly illustrated, in the second embodiment, tape pre-wrapping can be eliminated.

Third Embodiment

Hereinafter, a third embodiment will be described with reference to the drawings. FIGS. 3A to 3C are schematic views showing another embodiment of the exterior member for electric wire and the wire harness of the present invention. FIG. 3A is an end view of the exterior member for electric wire before the electric wire is accommodated. FIG. 3B is an end view of the exterior member for electric wire after the electric wire is accommodated. FIG. 3C is a perspective view of the exterior member for electric wire. Component members and portions that are basically the same as those of the above-described first embodiment are denoted by the same reference numerals, and detailed description thereof will be partially omitted.

In FIGS. 3A to 3C, the wire harness 1 of the third embodiment includes the electric wire bundle 3, the exterior member for electric wire 2 of the third embodiment that accommodates and protects the electric wire bundle 3, and terminal fittings (not illustrated) provided at ends of electric wires of the electric wire bundle 3. The exterior member for electric wire 2 of the third embodiment can also accommodate the electric wire bundle 3 by one touch in the same manner as in the first and second embodiments.

The exterior member for electric wire 2 of the third embodiment includes the exterior body 4 having the slit 5, and the inner portion 6 continuous with the slit 5 (continuous with a circumferential end portion of the exterior body 4) on an outer side of the exterior body 4. The exterior body 4 is formed with a slit wrap portion 15 continuous with a left side portion of the slit 5 (continuous with a left circumferential end portion of the exterior body 4). Further, a slit wrap portion 16 is formed so as to be also continuous with a right side portion of the slit 5 (a right circumferential end portion of the exterior body 4). The slit wrap portions 15 and 16 are formed in a shape that can cover the slit 5 (a shape that can wrap the slit 5, a shape that can cover the slit 5). The slit wrap portions 15 and 16 of the present embodiment are formed so as to protrude upward from the left side portion and the right side portion of the slit 5 (circumferential end portion of the exterior body 4). The slit wrap portions 15 and 16 are formed such that the slit wrap portion 15 on a left side is slightly longer than the slit wrap portion 16 on a right side (not limited thereto, the right side may be longer).

In the above-described configuration and structure, when the electric wire bundle 3 is pressed against the electric wire pressed portion 13 of the inner portion 6 from an obliquely right upper side, the inner portion 6 is entirely deformed toward the slit 5 by a pressing force. Then, when the electric wire bundle 3 passes through the slit 5, the slit 5 is pushed and widened by the electric wire bundle 3. At this time, since the inner portion 6 is present between the electric wire bundle 3 and the slit 5, the electric wire bundle 3 is protected by the inner portion 6 (the electric wire bundle 3 is not damaged by the slit 5 even when a jig as in the related art is not used). When the electric wire bundle 3 is pushed (inserted) into the exterior body 4 together with the inner portion 6, the inner portion 6 is in a state of being completely inverted. Accordingly, accommodation of the electric wire bundle 3 is completed. When the inner portion 6 is accommodated in the exterior body 4, the inner side lock portion 12 is engaged with the body side lock portion 10 at this time. The inner portion 6 is in a state of being pulled toward a body side lock portion 10 side by the engagement. As a result, the slit wrap portions 15 and 16 cover the slit 5 from both left and right sides. In the third embodiment, since the slit wrap portions 15 and 16 cover the slit 5, foreign matter can be prevented from entering more favorably than in the first embodiment. Although not particularly illustrated, in the third embodiment, tape pre-wrapping can be eliminated.

Fourth Embodiment

Figure 4C:
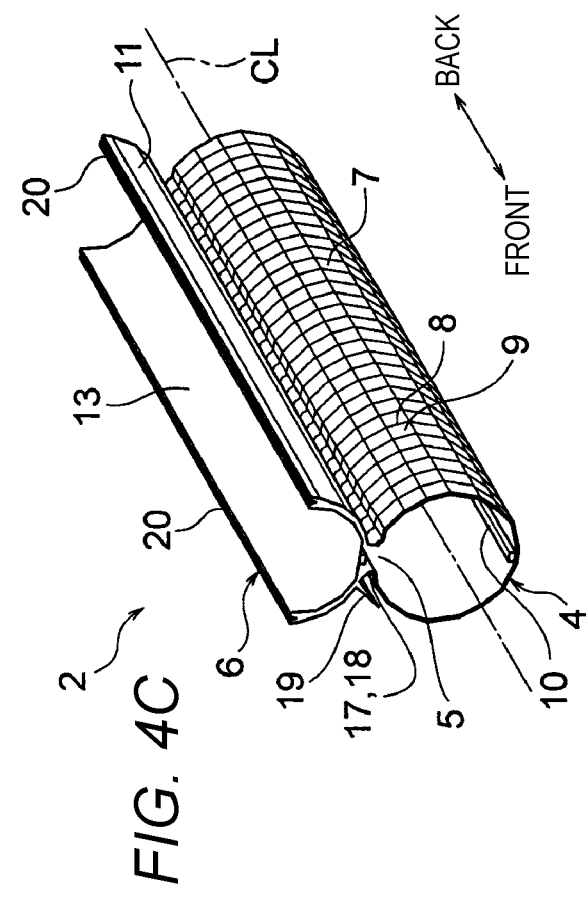
Figure 4A:
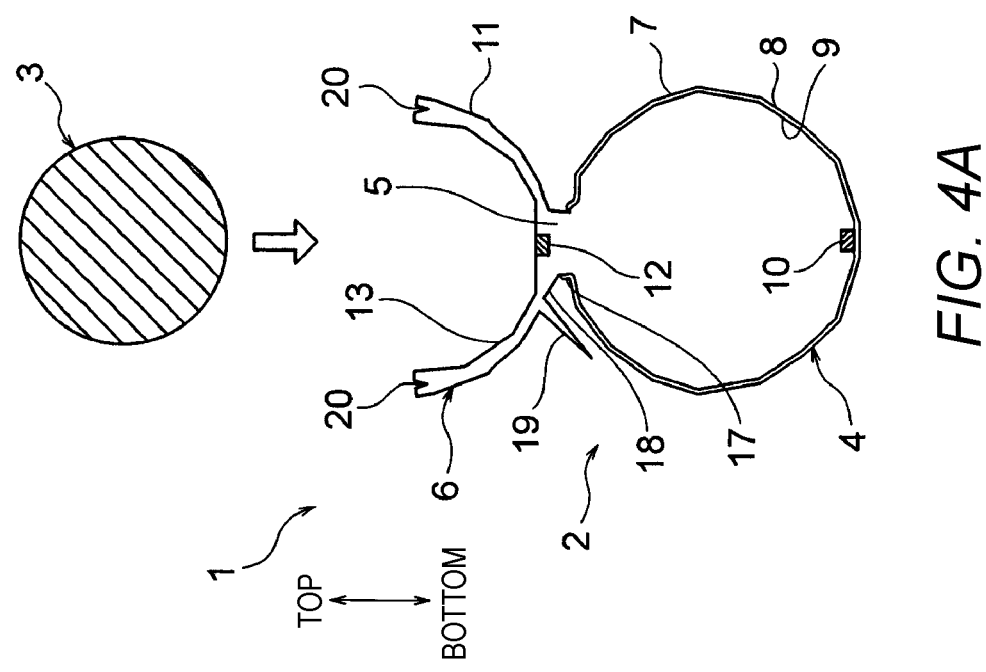

Hereinafter, a fourth embodiment will be described with reference to the drawings. FIGS. 4A to 4C are schematic views showing another embodiment of the exterior member for electric wire and the wire harness of the present invention. FIG. 4A is an end view of the exterior member for electric wire before the electric wire is accommodated. FIG. 4B is an end view of the exterior member for electric wire after the electric wire is accommodated. FIG. 4C is a perspective view of the exterior member for electric wire. Component members and portions that are basically the same as those of the above-described first embodiment are denoted by the same reference numerals, and detailed description thereof will be partially omitted.

In FIGS. 4A to 4C, the wire harness 1 of the fourth embodiment includes the electric wire bundle 3, the exterior member for electric wire 2 of the fourth embodiment that accommodates and protects the electric wire bundle 3, and terminal fittings (not illustrated) provided at ends of electric wires of the electric wire bundle 3. The exterior member for electric wire 2 of the fourth embodiment can also accommodate the electric wire bundle 3 by one touch in the same manner as in the first to third embodiments.

The exterior member for electric wire 2 of the fourth embodiment includes the exterior body 4 having the slit 5, and the inner portion 6 continuous with the slit 5 (continuous with a circumferential end portion of the exterior body 4) on an outer side of the exterior body 4. A rib 17 that protrudes slightly upward is formed on a left side portion of the slit 5 (a left circumferential end portion of the exterior body 4). The inner portion 6 of the fourth embodiment is formed in such a shape that an upper half of the inner portion 6 (see FIGS. 2A to 2C) of the second embodiment is inverted downward. In other words, the inner portion 6 of the fourth embodiment is formed in a semicircular shape in an end surface view. The inner portion 6 having such a shape is formed so that the electric wire pressed portion 13 can be made large. Reference numerals 18 and 19 denote slit wrap portions. Further, Reference numeral 20 denotes a hinge portion serving as a folded portion. The slit wrap portions 18 and 19 are arranged so as to be continuous with the rib 17, and are formed in a shape that can cover the slit 5 (a shape that can wrap the slit 5, a shape that can cover the slit 5).

In the above-described configuration and structure, when the electric wire bundle 3 is pressed against the large electric wire pressed portion 13 of the inner portion 6 from above, the inner portion 6 is entirely deformed toward the slit 5 by a pressing force. Then, when the electric wire bundle 3 passes through the slit 5, the slit 5 is pushed and widened by the electric wire bundle 3. At this time, since the inner portion 6 is present between the electric wire bundle 3 and the slit 5, the electric wire bundle 3 is protected by the inner portion 6 (the electric wire bundle 3 is not damaged by the slit 5 even when a jig as in the related art is not used). When the electric wire bundle 3 is pushed (inserted) into the exterior body 4 together with the inner portion 6, the inner portion 6 is in an illustrated state. Accordingly, accommodation of the electric wire bundle 3 is completed. When the inner portion 6 is accommodated in the exterior body 4, the inner side lock portion 12 is engaged with the body side lock portion 10 at this time. The inner portion 6 is in a state of being pulled toward a body side lock portion 10 side by the engagement. As a result, the slit wrap portions 18 and 19 cover the slit 5 from a left side. In the fourth embodiment, since the slit wrap portions 18 and 19 cover the slit 5, foreign matter can be prevented from entering more favorably than in the first embodiment. Although not particularly illustrated, in the fourth embodiment, tape pre-wrapping can be eliminated.

Fifth Embodiment

Figure 5B:
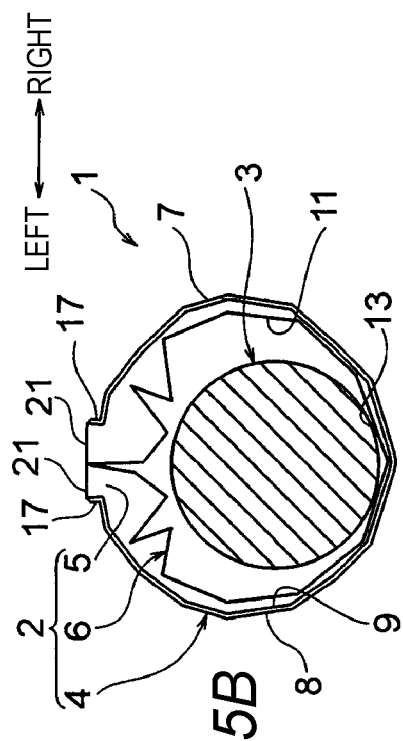
FIGS. 5A to 5C are schematic views showing another embodiment of the exterior member for electric wire and the wire harness of the present invention.
Figure 5C:
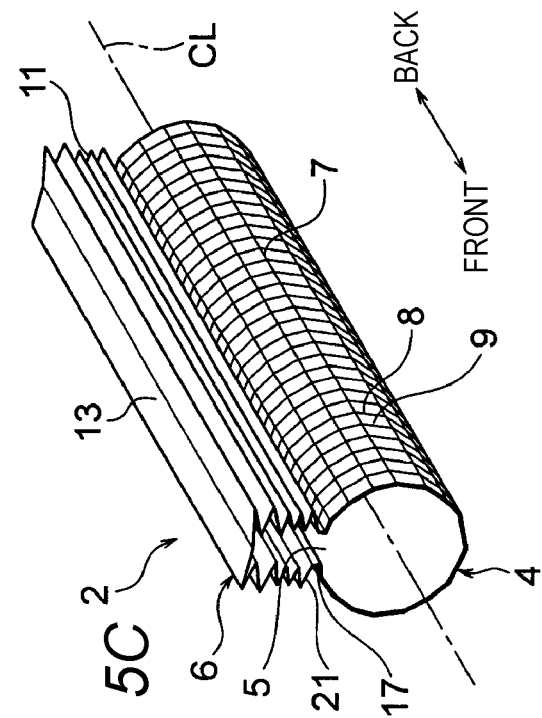
Figure 5A:
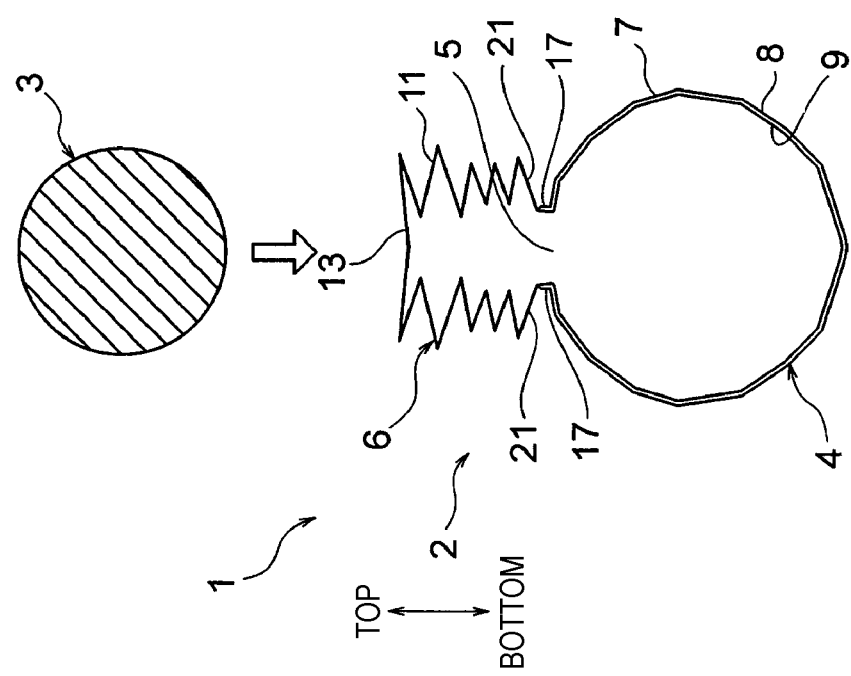

Hereinafter, a fifth embodiment will be described with reference to the drawings. FIGS. 5A to 5C are schematic views showing another embodiment of the exterior member for electric wire and the wire harness of the present invention. FIG. 5A is an end view of the exterior member for electric wire before the electric wire is accommodated. FIG. 5B is an end view of the exterior member for electric wire after the electric wire is accommodated. FIG. 5C is a perspective view of the exterior member for electric wire. Component members and portions that are basically the same as those of the above-described first embodiment are denoted by the same reference numerals, and detailed description thereof will be partially omitted.

In FIGS. 5A to 5C, the wire harness 1 of the fifth embodiment includes the electric wire bundle 3, the exterior member for electric wire 2 of the fifth embodiment that accommodates and protects the electric wire bundle 3, and terminal fittings (not illustrated) provided at ends of electric wires of the electric wire bundle 3. The exterior member for electric wire 2 of the fifth embodiment can also accommodate the electric wire bundle 3 by one touch in the same manner as in the first to fourth embodiments.

The exterior member for electric wire 2 of the fifth embodiment includes the exterior body 4 having the slit 5, and the inner portion 6 continuous with the slit 5 (continuous with a circumferential end portion of the exterior body 4) on an outer side of the exterior body 4. The ribs 17 that protrude slightly upward are formed on a left side portion and a right side portion (a circumferential end portion of the exterior body 4) of the slit 5, respectively. The inner portion 6 of the fifth embodiment is formed with slit wrap portions 21, the bellows-shaped side surface 11 that is uneven in a left-right direction, and the electric wire pressed portion 13. The slit wrap portions 21 are formed so as to be continuous with the left and right ribs 17, and are formed in a shape that can cover the slit 5 (a shape that can wrap the slit 5, a shape that can cover the slit 5). The side surface 11 is disposed so as to be continuous with the left and right slit wrap portions 21. The electric wire pressed portion 13 is disposed at an upper position of the inner portion 6.

In the above-described configuration and structure, when the electric wire bundle 3 is pressed against the electric wire pressed portion 13 of the inner portion 6 from above, the inner portion 6 is entirely deformed toward the slit 5 by a pressing force. Then, when the electric wire bundle 3 passes through the slit 5, the slit 5 is pushed and widened by the electric wire bundle 3. At this time, since the inner portion 6 is present between the electric wire bundle 3 and the slit 5, the electric wire bundle 3 is protected by the inner portion 6 (the electric wire bundle 3 is not damaged by the slit 5 even when a jig as in the related art is not used). When the electric wire bundle 3 is pushed (inserted) into the exterior body 4 together with the inner portion 6, the bellows-shaped side surface 11 of the inner portion 6 is in an illustrated state. Accordingly, accommodation of the electric wire bundle 3 is completed. When the inner portion 6 is accommodated in the exterior body 4, the slit wrap portions 21 on both left and right sides cover the slit 5 at this time. In the fifth embodiment, since the slit wrap portions 21 on both the left and right sides cover the slit 5, foreign matter can be prevented from entering more favorably than in the first embodiment. In addition, in the fifth embodiment, as can be seen from the drawings, it is possible to reduce a size of the inner portion 6. Although not particularly illustrated, in the fifth embodiment, tape pre-wrapping can be eliminated.

Sixth Embodiment

Hereinafter, a sixth embodiment will be described with reference to the drawings. FIGS. 6A to 6C are schematic views showing another embodiment of the exterior member for electric wire and the wire harness of the present invention. FIG. 6A is an end view of the exterior member for electric wire before the electric wire is accommodated. FIG. 6B is an end view of the exterior member for electric wire after the electric wire is accommodated. FIG. 6C is a perspective view of the exterior member for electric wire. Component members and portions that are basically the same as those of the above-described first embodiment are denoted by the same reference numerals, and detailed description thereof will be partially omitted.

In FIGS. 6A to 6C, the wire harness 1 of the sixth embodiment includes the electric wire bundle 3, the exterior member for electric wire 2 of the sixth embodiment that accommodates and protects the electric wire bundle 3, and terminal fittings (not illustrated) provided at ends of electric wires of the electric wire bundle 3. The exterior member for electric wire 2 of the sixth embodiment can also accommodate the electric wire bundle 3 by one touch in the same manner as in the first to fifth embodiments.

The exterior member for electric wire 2 of the sixth embodiment includes the exterior body 4 having the slit 5, and the inner portion 6 continuous with the slit 5 (continuous with a circumferential end portion of the exterior body 4) on an outer side of the exterior body 4. The ribs 17 that protrude slightly upward are formed on a left side portion and a right side portion (a circumferential end portion of the exterior body 4) of the slit 5, respectively. The inner portion 6 of the sixth embodiment is formed with slit wrap portions 22 to 24, the illustrated side surface 11 in which arc-shaped surfaces are continuous by a hinge function, and the electric wire pressed portion 13. The slit wrap portion 22 is formed so as to be continuous with the rib 17 on a left side. Further, the slit wrap portions 23 and 24 are formed so as to be continuous with the rib 17 on a right side. The slit wrap portions 22 to 24 are formed in a shape that can cover the slit 5 in an overlapped state (a shape that can cover the slit 5). The side surface 11 is disposed so as to be continuous with the left and right slit wrap portions 22 and 24. The electric wire pressed portion 13 is disposed at an upper position of the inner portion 6.

In the above-described configuration and structure, when the electric wire bundle 3 is pressed against the electric wire pressed portion 13 of the inner portion 6 from above, the inner portion 6 is entirely deformed toward the slit 5 by a pressing force. Then, when the electric wire bundle 3 passes through the slit 5, since the inner portion 6 is present between the electric wire bundle 3 and the slit 5, the electric wire bundle 3 is protected by the inner portion 6 (the electric wire bundle 3 is not damaged by the slit 5 even when a jig as in the related art is not used). When the electric wire bundle 3 is pushed (inserted) into the exterior body 4 together with the inner portion 6, the inner portion 6 is in an illustrated state. That is, the inner portion 6 is in a state where the side surface 11 in which the arc-shaped surfaces are continuous surrounds and holds the electric wire bundle 3. Thus, accommodation of the electric wire bundle 3 is completed. When the inner portion 6 is accommodated in the exterior body 4, the left and right slit wrap portions 22 to 24 overlap one another and cover the slit 5 at this time. In the sixth embodiment, since the left and right slit wrap portions 22 to 24 cover the slit 5, foreign matter can be prevented from entering more favorably than in the first embodiment. Further, in the sixth embodiment, the electric wire bundle 3 can be held by the inner portion 6 and disposed at a center. Although not particularly illustrated, in the sixth embodiment, tape pre-wrapping can be eliminated.

In addition, it goes without saying that the present invention can be variously modified within a range not changing the gist of the present invention.

An exterior member for electric wire of the embodiment includes a tubular exterior body for protecting one or a plurality of electric wires, a slit formed in the exterior body along an exterior axis of the exterior body, and an inner portion continuous with a circumferential end portion of the exterior body around the exterior axis. The inner portion is disposed on an outer side of the exterior body before the electric wire is accommodated, is formed with an electric wire pressed portion against which the electric wire is pressed, and is pushed into the exterior body through the slit while being deformed so as to be inverted when the electric wire is pressed against the electric wire pressed portion and is accommodated in the exterior body together with the electric wire.

According to the exterior member for electric wire having such characteristics, when the electric wire is pressed against the electric wire pressed portion formed on the inner portion, the inner portion is deformed toward the slit by a pressing force. Then, when the electric wire passes through the slit, the slit is pushed and widened by the electric wire. At this time, since the inner portion is present between the electric wire and the slit, the electric wire is protected by the inner portion (the electric wire is not damaged by the slit even when a jig as in the related art is not used). When the electric wire is inserted into the exterior body together with the inner portion, the inner portion is in an inverted state. Accordingly, accommodation of the electric wire is completed. According to the present invention, since the accommodation of the electric wire is completed only by pushing the electric wire (the accommodation of the electric wire is completed by one touch), use of an automatic machine is enabled. Labor saving can also be achieved by enabling the use of the automatic machine. Further, according to the present embodiment, it is not necessary to use a jig for inserting the electric wire, and when the work of accommodating the electric wire is performed manually, it is possible to improve workability as compared with the related art.

In the exterior member for electric wire of the embodiment, a slit wrap portion that can cover the slit may be formed on the circumferential end portion or the inner portion.

According to such an exterior member for electric wire, in a state where the inner portion and the electric wire are accommodated in the exterior body, the slit can be covered by the slit wrap portion (the slit can be wrapped by the slit wrap portion). When the slit can be covered, it is possible to contribute to prevention of entry of the foreign matter.

The exterior body may be formed in a polygonal shape in an end surface view.

According to such an exterior member for electric wire, deformation of the exterior body when the electric wire is inserted into the exterior body together with the inner portion can be made easier as compared with a case of a circular cross section.

A body side lock portion may be formed on the exterior body, and an inner side lock portion that engages with the body side lock portion may be formed on the inner portion.

According to such an exterior member for electric wire, since the body side lock portion and the inner side lock portion have a structure of being engaged with each other, the inner portion in the exterior body can be held. Further, according to the present invention, when the inner portion can be put into a state of being pulled toward a body side lock portion side by the engagement between the body side lock portion and the inner side lock portion, an interval of the slit can be narrowed, which contributes to the prevention of the entry of the foreign matter.

The exterior body may be formed in a bellows tube shape in which peak portions and valley portions in a circumferential direction around the exterior axis are alternately provided along the exterior axis.

According to such an exterior member for electric wire, since the exterior body is formed in the bellows tube shape, the exterior member for electric wire that is easily bent can be obtained. Further, according to the present invention, the exterior body having the bellows tube shape can also be provided with an appearance and characteristics of a corrugated tube.

The wire harness of the embodiment includes one or a plurality of electric wires, and the exterior member for electric wire described above for protecting the electric wires.

According to such a wire harness, since the above-described exterior member for electric wire is provided, a better wire harness can be provided.

According to the exterior member for electric wire of the embodiment, there is an effect that the electric wire can be accommodated by using the automatic machine. Further, according to the wire harness of the present invention, there is an effect that a better wire harness can be provided.

What is claimed is:
1. An exterior member for electric wire comprising:
    a tubular exterior body that protects one or a plurality of electric wires;

a slit that is formed in the exterior body along an exterior axis of the exterior body; and an inner portion that continuous with a circumferential end portion of the exterior body around the exterior axis, wherein the inner portion is disposed on an outer side of the exterior body before the electric wire is accommodated, is formed with an electric wire pressed portion against which the electric wire is pressed, and is pushed into the exterior body through the slit while being deformed so as to be inverted when the electric wire is pressed against the electric wire pressed portion and is accommodated in the exterior body together with the electric wire, the exterior body includes a first outer surface and a first inner surface, and the inner portion includes a second outer surface and a second inner surface that are outside of the exterior body before the electric wire is accommodated, the second outer surface opposes the electric wire when the inner portion is inverted, and the second inner surface opposes the first inner surface when the inner portion is inverted.

2. The exterior member for electric wire according to claim 1, wherein a slit wrap portion configured to cover the slit is formed on the circumferential end portion or the inner portion.

3. The exterior member for electric wire according to claim 1, wherein the exterior body is formed in a polygonal shape in an end surface view.

4. The exterior member for electric wire according to claim 1, wherein a body side lock portion is formed on the exterior body, and an inner side lock portion that engages with the body side lock portion is formed on the inner portion.

5. The exterior member for electric wire according to claim 1, wherein the exterior body is formed in a bellows tube shape in which peak portions and valley portions in a circumferential direction around the exterior axis are alternately provided along the exterior axis.

6. A wire harness comprising:

one or a plurality of electric wires; and the exterior member for electric wire according to claim 1 so as to protect the electric wire.

* * * * *